(12) United States Patent
Kulbeth

(10) Patent No.: US 11,040,300 B1
(45) Date of Patent: Jun. 22, 2021

(54) FLOW BACK SEPARATION SYSTEM WITH DISPERSING DEVICE

(71) Applicant: DEL Corporation, Lafayette, LA (US)

(72) Inventor: Robert M. Kulbeth, Church Point, LA (US)

(73) Assignee: DEL Corporation, Lafayette, LA (US)

( * ) Notice: Subject to any disclaimer, the term of this patent is extended or adjusted under 35 U.S.C. 154(b) by 47 days.

(21) Appl. No.: 16/734,559

(22) Filed: Jan. 6, 2020

Related U.S. Application Data

(60) Provisional application No. 62/895,798, filed on Sep. 4, 2019.

(51) Int. Cl.

| | | |
|---|---|---|
| *B01D 36/04* | (2006.01) | |
| *E21B 21/06* | (2006.01) | |
| *B01D 19/00* | (2006.01) | |
| *B01D 21/00* | (2006.01) | |
| *E21B 43/34* | (2006.01) | |
| *B01D 21/24* | (2006.01) | |
| *B01D 17/02* | (2006.01) | |
| *B01D 33/01* | (2006.01) | |
| *B01D 33/72* | (2006.01) | |
| *B01D 21/02* | (2006.01) | |
| *C02F 9/00* | (2006.01) | |
| *B01D 33/03* | (2006.01) | |

(52) U.S. Cl.
CPC ......... *B01D 36/04* (2013.01); *B01D 17/0214* (2013.01); *B01D 19/0068* (2013.01); *B01D 21/0012* (2013.01); *B01D 21/0018* (2013.01); *B01D 21/0042* (2013.01); *B01D 21/10* (2013.01); *B01D 21/2461* (2013.01); *B01D 33/01* (2013.01); *B01D 33/03* (2013.01); *B01D 33/72* (2013.01); *C02F 9/00* (2013.01); *E21B 21/065* (2013.01); *E21B 43/34* (2013.01)

(58) Field of Classification Search
CPC ............ B01D 17/0214; B01D 19/0068; B01D 21/0042; B01D 21/0045; B01D 21/2461; B01D 33/03; B01D 36/04; E21B 21/065; E21B 43/34; E21B 43/35; E21B 43/40; C02F 1/40; C02F 9/00
USPC .... 210/188, 195.1, 196, 299, 305, 388, 521, 210/523; 166/75.12
See application file for complete search history.

(56) References Cited

U.S. PATENT DOCUMENTS

| | | | | |
|---|---|---|---|---|
| 4,247,312 A | * | 1/1981 | Thakur | .............. B01D 21/2461 210/522 |
| 6,506,310 B2 | | 1/2003 | Kulbeth | |

(Continued)

OTHER PUBLICATIONS

Applicant's copending U.S. Appl. No. 16/131,900, filed Sep. 14, 2018.

(Continued)

*Primary Examiner* — Christopher Upton
(74) *Attorney, Agent, or Firm* — Jones Walker LLP

(57) ABSTRACT

A flow back system for separating solids from a slurry recovered from a hydrocarbon well. The system includes a V-shaped tank with a first series of baffles configured to cause the settling of solids that are moved by a shaftless auger to a conduit fluidly connected to a dispersing device mounted over or adjacent to a shaker such as a linear shaker. The shaker receives and processes the output of the dispersing device and dewaters solids. The underflow of the shaker is recirculated through the tank.

28 Claims, 10 Drawing Sheets

(56) References Cited

U.S. PATENT DOCUMENTS

| | | | |
|---|---|---|---|
| 6,808,354 B1 * | 10/2004 | Kulbeth | E21B 21/06 198/550.1 |
| 6,808,626 B2 | 10/2004 | Kulbeth | |
| 6,976,819 B2 | 12/2005 | Kulbeth | |
| 7,514,011 B2 | 4/2009 | Kulbeth | |
| 7,544,302 B2 * | 6/2009 | Harding | E21B 21/065 210/521 |
| 8,449,779 B2 * | 5/2013 | Thompson | E21B 21/065 210/523 |
| 8,517,167 B2 | 8/2013 | Thompson | |
| 9,498,739 B2 | 11/2016 | Thompson | |
| 9,597,614 B2 | 3/2017 | Thompson | |
| 9,687,761 B2 | 6/2017 | Thompson | |
| 10,399,029 B1 * | 9/2019 | Hiracheta | E21B 43/34 |
| 10,751,654 B1 * | 8/2020 | Kulbeth | B01D 21/2461 |
| 10,773,188 B1 * | 9/2020 | Kulbeth | B01D 21/2461 |
| 10,857,488 B1 * | 12/2020 | Kulbeth | B01D 33/03 |
| 2009/0277632 A1 * | 11/2009 | Frazier | E21B 21/065 166/267 |
| 2019/0060794 A1 * | 2/2019 | Droke | B01D 21/2461 |

OTHER PUBLICATIONS

Applicant's copending U.S. Appl. No. 16/227,417, filed Dec. 20, 2018.
Applicant's copending U.S. Appl. No. 16/229,324, filed Dec. 21, 2018.
Applicant's copending U.S. Appl. No. 16/290,350, filed Mar. 1, 2019.
Applicant's copending U.S. Appl. No. 16/393,718, filed Apr. 24, 2019.
Applicant's copending U.S. Appl. No. 16/529,513, filed Aug. 1, 2019.

* cited by examiner

FLOW BACK SEPARATION SYSTEM WITH DISPERSING DEVICE

CROSS-REFERENCE TO RELATED APPLICATIONS

This application claims the benefit of and priority to U.S. Provisional Patent Application 62/895,798, filed on Sep. 4, 2019, which is incorporated herein by reference.

BACKGROUND OF THE DISCLOSURE

The present disclosure relates to a flow back separation system for separating solids from a fluid containing a dispersing device

SUMMARY OF THE DISCLOSURE

The present disclosure relates to a flow back separation system for separating solids from a slurry recovered from a hydrocarbon well (e.g. frac fluid containing solids). The system may include a tank with a first series of baffles configured to cause the settling of solids that are moved by a shaftless auger to a conduit fluidly connected to a dispersing device. The tank may be V-shaped. The dispersing device may be mounted over a shaker. The shaker may be a linear, orbital, or elliptical shaker. The dispersing device may also be operatively positioned adjacent to the shaker. The shaker may receive and process the output of the dispersing device to dewater solids. The underflow of the shaker may be recirculated through the tank.

In an embodiment of the system for separating solids from a first slurry recovered from a hydrocarbon well, the system may include a V-shaped tank. The V-shaped tank may have sloping side walls, a bottom, and a top. The tank may have a front section, a mid-section, and a rear section. The system may include a degassing unit operatively positioned above the top of the tank or partially within the tank. The degassing unit may remove an entrained gas from the first slurry and discharge a second slurry into the tank. The system may include a first series of one or more baffles operatively positioned within the tank at its mid-section. The first series of one or more baffles may cause a first settling of a first solids within at least a portion of the first slurry. The system may include a shaftless auger operatively positioned on the bottom of the tank. The shaftless auger may be configured for rotation to cause the first solids to move to the rear section of the tank. The system may include a suction pump in fluid communication with a first conduit. The first conduit may have an inlet and an outlet. The inlet of the first conduit may be operatively positioned within the tank at its rear section adjacent the shaftless auger. The suction pump may be configured to pump a second slurry containing the first solids through the first conduit. The system may include a dispersing device in fluid communication with the outlet of the first conduit. The dispersing device may have an interior that receives the second slurry but does not separate the first solids. The dispersing device may include an outlet opening through which the second slurry is discharged. The dispersing device may be positioned above or adjacent to a shaker whereby the second slurry is discharged through the outlet opening onto the shaker. The shaker may be operatively positioned and configured to receive and process at least a portion of the second slurry and to cause a dewatering of the first solids to produce a dried first solids. The shaker may be further configured to convey the dried first solids for disposal or reuse. The shaker may produce an underflow comprising a third slurry comprising a second solids. The shaker may be configured for depositing the third slurry into the tank at its rear section for recirculation through the first conduit to the dispersing device. The system may include a second series of one or more baffles operatively positioned within the tank at its front section. The second series of one or more baffles may cause a second settling of a third solids. The third solids may be moved to the rear section of the tank by the rotation of the shaftless auger. The system may include an underflow weir operatively positioned within the tank at its front section directly adjacent to a last baffle in the second series of one or more baffles. The underflow weir may be configured to cause first clean fluid to flow under the underflow weir. The system may include an overflow pipe operatively positioned within the tank at its front end directly adjacent to the underflow weir. The overflow pipe may be configured to provide an outlet for the first clean fluid to exit the tank.

In another embodiment of the system, the dispersing device may be positioned above the shaker.

In yet another embodiment of the system, the dispersing device may include a front, a back, two sides, a top, a bottom, and an interior. The outlet opening may be positioned on the bottom.

In yet another embodiment of the system, the outlet opening may comprise a plurality of outlet openings.

In yet another embodiment of the system, the dispersing device may include an inlet aperture. The outlet of the first conduit may be affixed to the dispersing device at the inlet aperture.

In yet another embodiment of the system, the inlet aperture may be positioned at the front, at one of the sides, or at the top of the dispersing device.

In yet another embodiment of the system, the dispersing device may be positioned adjacent to the shaker.

In yet another embodiment of the system, the dispersing device may include a front, a back, two sides, a top, a bottom, and an interior. The dispersing device may have an extended portion rising above the shaker. The outlet opening may be positioned on the extended portion above the shaker.

In yet another embodiment of the system, the outlet opening may comprise a plurality of outlet openings.

In yet another embodiment of the system, the dispersing device may include an inlet aperture. The outlet of the first conduit may be affixed to the dispersing device at the inlet aperture.

In yet another embodiment of the system, the inlet aperture may be positioned at the back, at one of the sides, or at the top of the dispersing device.

In yet another embodiment of the system, the system may further comprise an oil skimmer operatively positioned within the tank at its front section between the last baffle in the second series of one or more baffles and the underflow weir.

In yet another embodiment of the system, the system may further comprise one or more oil skimmers positioned within the tank at its rear section.

In yet another embodiment of the system, the shaftless auger may comprise a full pitch section and a half pitch section. The full pitch section may be operatively positioned at the rear section of the tank.

In yet another embodiment of the system, the first series of one or more baffles may be slanted in a first direction and the second series of one or more baffles may be slanted in a second direction.

In yet another embodiment of the system, the shaker is a linear shaker.

In yet another embodiment of the system, the system may further comprise a spray bar pump in fluid communication with a spray bar conduit. The spray bar pump may be configured to pump the first clean fluid from the front end of the tank to the linear shaker via the spray bar conduit. In this embodiment, the linear shaker may include one or more slotted pipes in fluid communication with the spray bar conduit. The one or more slotted pipes may be operatively positioned adjacent a bed of the linear shaker. The one or more slotted pipes may be configured to discharge a portion of the first clean fluid into the bed.

DETAILED DESCRIPTION OF THE DISCLOSURE

Figure 1:
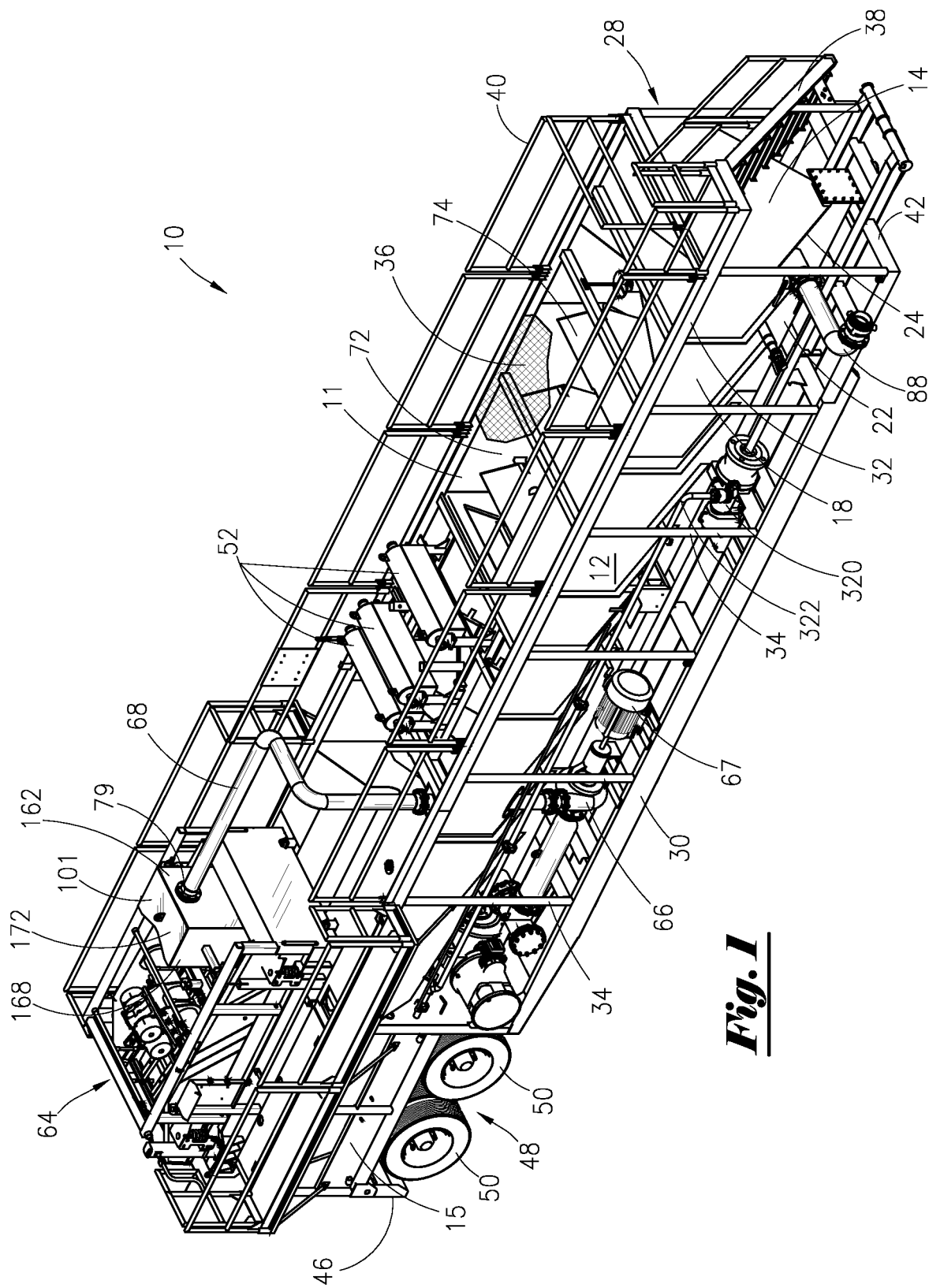
FIG. 1 is a perspective view of an embodiment of the flow back separation system with dispersing device.

With reference to the figures where like elements have been given like numerical designation to facilitate an understanding of the disclosure, and particularly with reference to the embodiment of the disclosure illustrated in FIGS. 1-4, flow back separation system 10 may include tank 12. Tank 12 may have an open top 11. Tank 12 may include front wall 14, rear wall 17, right side wall 18, left side wall 20, and bottom wall 22. Tank 12 may be V-shaped or partially V-shaped. Tank 12 may be configured with tapering or V-shaped right and left side walls 18, 20.

Right and left side walls 18, 20 may each include lower section 24 tapering in the direction of bottom wall 22. Front wall 14 may be substantially vertical. The angle of lower sections 24 may be in the range of 30 degrees to 90 degrees relative to the horizontal ground. Rear wall 17 may contain an angled or sloped side extending from a top edge portion to a lower edge portion. In some aspects, the sloped side section may correspond to the right and left side walls 18, 20. Rear wall 17 may also contain lower vertical section extending from a lower edge portion to bottom wall 22. The angle of the sloped side section of rear wall 17 may be in the range from 30 degrees to 90 degrees relative to the horizontal ground. Tank 12 may have a height in the range of 6 feet to 10 feet, a length in the range of 30 feet to 50 feet, and a width in the range of 8 feet to 12 feet. Tank 12 may hold a volume of slurry in the range of 4,200 gallons to 45,000 gallons. Tank 12 may be composed of metal.

With reference to FIGS. 1-4, tank 12 may be housed within supporting frame 28. Supporting frame 28 may be made of metal and comprise a unitary construction or be constructed with component parts that may be fixedly secured (e.g., by welding) or detachably secured (by bolts, rivets or the like). Supporting frame 28 may include bottom horizontal frame 30 and top horizontal frame 32. Bottom and top horizontal frames 30, 32 may be interconnected by a plurality of vertical support members 34. Top horizontal frame 32 supports deck 36 that is positioned above the open top of tank 12. Deck 36 is accessible to personnel operating system 10 by stairway 38. Guardrail 40 may extend around the periphery of deck 36.

Figure 3:
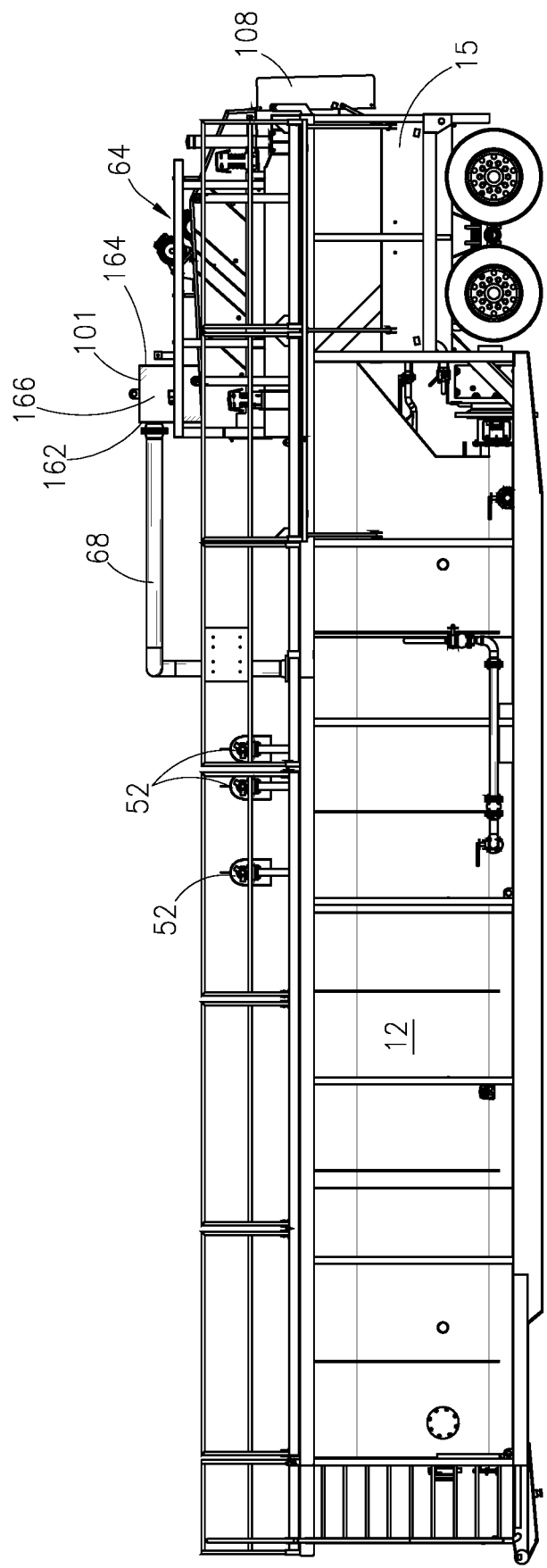
FIG. 3 is a side view of the flow back separation system shown in FIG. 1.
Figure 4:
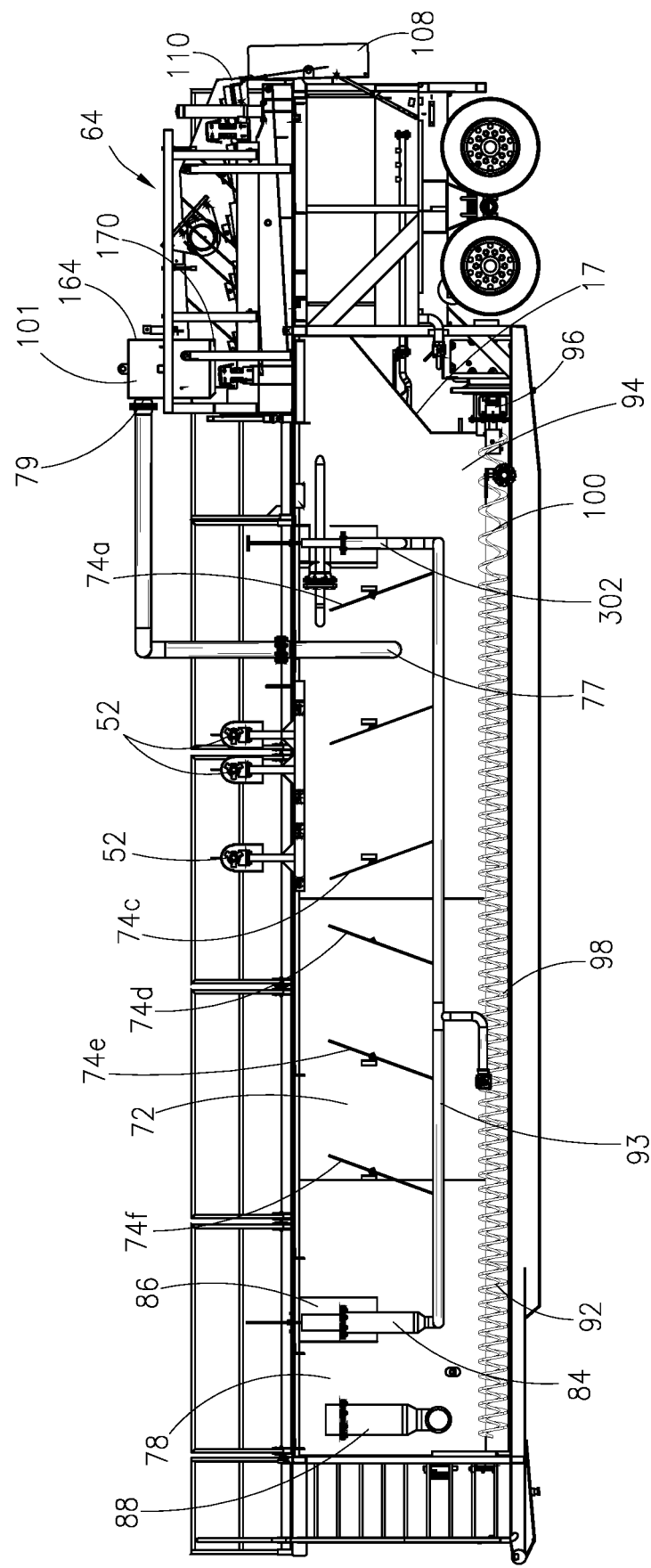
FIG. 4 is a cross-sectional view of the flow back separation system taken along lines 4-4 of FIG. 2.

As seen in FIGS. 1, 3 and 4, system 10 may include containment pan 15 positioned behind tank 12 and below linear shaker 64. It is to be understood that other types of shakers may be used such as an orbital or elliptical shaker. Containment pan 15 may have an open top to catch and contain any fluids/solids that may drip down from linear shaker 64. Containment pan 15 may also include one or more drains for discharge of the contained fluids/solids.

FIGS. 1-4 also illustrate that system 10 may be configured to be transportable. For example, front end 42 of bottom frame 30 may include hitch member 44 for connection to a towing vehicle such as a truck. Back end 46 of bottom frame 30 may be affixed with a wheel assembly 48 that includes two or more wheels 50. In one embodiment, wheel assembly 48 includes eight wheels 50. The towing vehicle may lift front end 42 so that bottom frame 30 is positioned above the ground with only wheels 50 in contact with the ground. System 10 can then be transported to and from the work site.

When fully assembled, system 10 may have overall dimensions that include a height in the range of about 9 feet to about 20 feet, a length in the range of about 30 feet to about 55 feet, a width in the range of about 8 feet to about 15 feet.

Again with reference to FIGS. 1-4, system 10 may include degassing unit 52 (also known as "gas busters" or "degassing units"). Degassing unit 52 may be operatively positioned over the top of the tank 12 and/or partially within tank 12 depending on the type of degassing unit 52 used. For example, degassing unit 52 may be a horizontal degasser positioned at mid-deck section 54 on deck 36, or may be positioned in other places relative to tank 12. Degassing unit 52 may also be a vertical degasser positioned partially within tank 12. While the Figures depict system 10 with three degassing units 52, it is to be understood that this is for illustrative purposes only and that system 10 may include one degassing unit 52, two degassing units 52, three degassing units 52, or a plurality of degassing units 52. Furthermore, while the Figures depict degassing units 52 as being horizontal gas busters, it is to be further understood that degassing units 52 may be horizontal gas busters, vertical gas busters, or any combination thereof. In some embodiments employing a plurality of degassing units 52, one or more of degassing units 52 may be operational while the others may be on standby. Degassing units 52 (both horizontal and vertical) are commercially available from DEL Corporation.

As seen in FIGS. 1-4, degassing unit 52 may receive fluid containing solids (e.g. first slurry 116 from one or more hydrocarbon wells) and function to remove entrained gas present in first slurry 116. A portion of first slurry 116 may be pumped to individual degassing units 52. For example, a portion of first slurry 116 (e.g., about 50%) may flow to one degassing unit 52, and a portion of first slurry 116 (e.g., about 50%) may flow to a second degassing unit 52. In some embodiments, the flow of first slurry 116 may be divided between three or more degassing units 52 or may be divided into other percentages between the plurality of degassing units 52. Furthermore, degassing unit 52 may also receive first slurry 116 produced from more than one well, as for example, from two or more wells.

As illustrated in FIGS. 1-4, after removing entrained gas, degassing unit 52 discharges the degassed fluid containing solids (e.g. second slurry 118) into tank 12. Tank 12 may contain internal area 72 for housing second slurry 118 for processing. One or more baffles may be operatively positioned within internal area 72. For example, baffles 74*a*, 74*b*, and 74*c* may be operatively positioned at the mid-section 76 of internal area 72 in spaced relation. Additionally, baffles 74*d*, 74*e* and 74*f* may be operatively positioned in front section 78 of internal area 72 in spaced relation. Baffles 74*a*-74*f* may extend or hang from the top of tank 12. Baffles 74*a*-74*f* may be tapered at their sides and in the direction of bottom wall 22 to conform to the V-shaped profile of tank 12. Baffles 74*a*-74*f* may also be angled or tilted. Baffles 74*a*-74*f* may be tilted at an angle in the range of 45 degrees to 90 degrees relative to the horizontal ground. In some embodiments, baffles 74*a*-74*f* may be tilted in the direction of fluid flow through tank 12. Baffles 74*a*-74*f* may all be tilted in the same direction. For example, baffles 74*a*-74*f* may be tilted such that the lower portions of baffles 74*a*-74*f* may be positioned closer to the front of tank 12. In some embodiments, one or more of baffles 74*a*-74*f* may be tilted in different directions relative to other baffles 74*a*-74*f*. For example, baffles 74*a*-74*c* may be tilted such that the lower portion of baffles 74*a*-74*c* may be positioned closer to the back of tank 12, and baffles 74*d*-74*f* may be tilted such that the lower portion of baffles 74*d*-74*f* may be positioned closer to the front of tank 12. Baffles 74*a*-74*f* may be operatively positioned within tank 12 such that the bottom edge of each baffle 74*a*-74*f* is in the range of 1 to 5 feet from the bottom of tank 12. In some embodiments, this distance may be about 3 feet. The top edge of each baffle 74*a*-74*f* may be in the range of approximately 0 to 36 inches from the top of tank 12. In some embodiments, this distance may be approximately 15⅜ inches. Baffles 74*a*-74*f* may be constructed as separate units or formed as one or more baffle modules. For example, baffles 74*a*-74*c* may be constructed as a first baffle module. Baffles 74*d*-74*f* may be constructed as a second baffle module. Baffles 74*a*-74*f* (either singularly or in modules) may be made of metal (e.g., steel), plastic, or polymer, and may be either inserted into tank 12 and attached thereto by welding, bolts, rivets, and the like or made unitary with tank 12.

FIG. 4 shows the placement of shaftless auger 92 at the bottom of tank 12. Auger 92 is commercially available from Falcon Industries, Inc. under the trade name Shaftless Screw Conveyor. Auger 92 extends substantially the length of tank 12 from internal rear section 94 to front section 78. Auger 92 is operatively connected to auger motor 96, which serves to rotate auger 92 to facilitate the movement of solids 120 that have settled to the bottom of internal area 72 in the direction from front section 78 to rear section 94. Motor 96 may be an electric motor commercially available from Weg Electric Corp. under the trade name electric motor. Motor 96 may also be a pneumatic or hydraulic motor. Motor 96 may be controlled by a variable frequency drive (VFD) so that the speed of rotation may be varied. Thus, the operator may vary the speed of rotation of auger 92 so that the shaftless auger 92 may vary the concentration of solids 120 going to feed pump 66. For example, the operation of auger 92 may convey a heavier concentration of solids 120 to feed pump 66 (by decreasing rotation speed) or alternatively may convey a reduced concentration of solids 120 to feed pump 66 (by increasing rotation speed).

As seen in FIG. 4, auger 92 may include half pitch section 98 and a full pitch section 100. Full pitch section 100 is located at rear section 94 at or near the intake of feed pump 66. In half pitch section 98, flights of auger 92 are spaced apart in the range of 4.5 to 9 inches. In full pitch section 100, flights of auger 92 are spaced apart in the range of 9 to 18 inches. The flights may have a diameter in the range of 9 to 18 inches. The flights may have a 12 inch diameter. In one embodiment, the diameter of the flights may be the same as the distance between flights in the full pitch section. Solids 120 settled in half pitch section 98 exhibit an increase in height as compared to solids 120 settled in full pitch section 100. The reduction of solid 120 height at full pitch section 100 reduces clogging at the inlet of feed pump 66. In some cases, auger 92 may automatically begin to operate when feed pump 66 is energized.

With further reference to FIGS. 1-4, system 10 may include feed pump 66 that suctions solids 120 settling at the bottom of tank 12 and pumps solids 120 (within third slurry 119) through conduit 68 to dispersing device 101. Feed pump 66 may be any type of pump capable of generating pressures sufficient to pump third slurry 119 to dispersing device 101. For example, pump 66 may be a centrifugal pump operated by motor 67. Motor 67 may be an electric motor. It is to be understood that other types of pump motors may be used in system 10 such as a pneumatic or hydraulic motor. In some cases, feed pump 66 might begin to operate only after the fluid level in tank 12 rises to within a certain level (e.g. within three feet of the top of tank 12). In some cases, feed pump 66 might begin to operate automatically when the fluid level rises to a particular level (e.g. within three feet from the top of tank 12). Conduit 68 may include an inlet 77 and an outlet 79. In some embodiments, inlet 77 of first conduit 68 may be operatively positioned within the tank 12 at its rear section 94, adjacent shaftless auger 92. In some embodiments, a variable frequency drive (VFD) on feed pump 66 can vary the speed of pump 66, which may vary the flow rate and/or concentration to pull more or less liquid (third slurry 119) into the feed pump 66. The speed of pump 66 can be monitored and adjusted by adjusting the VFD. In some cases, the speed of motor 96 may be 900 rpm, or any suitable speed. The flow rate may, in some cases, be in the range of 1 to 1000 gallons/min. In some cases, auger 92 may start to operate after feed pump 66 is energized.

FIGS. 1-4 illustrate that dispersing device 101 may be fixedly (by welding) or detachably (by bolts, rivets or the like) attached above linear shaker 64. Dispersing device 101 could also be fixedly (by welding) or detachably (by bolts, rivets or the like) attached adjacent to linear shaker 64, as for example, proximal end 106. Dispersing device 101 may be in fluid communication with outlet 79 of first conduit 68 with dispersing device 101 receiving third slurry 119 and discharging third slurry 119 onto linear shaker 64 for processing. For example, outlet 79 may be attached to an outer surface of dispersing device 101 for flowing third slurry 119 through an inlet aperture in dispersing device 101 and into an interior of dispersing device 101. In some embodiments, there may be a plurality of dispersing devices 101 receiving a divided flow from the first conduit 68.

Dispersing device 101 may be configured as a feedbox as shown in FIGS. 1-4. The feedbox may have front 162, back

164, sides 166 and 168, bottom 170 and top 172. Bottom 170 may have outlet opening 174 formed therein. Bottom 170 may have more than one outlet opening 174 (e.g. a plurality of outlet openings 174). Third slurry 119 that enters interior 176 of the feedbox and passes through outlet opening 174 to disperse third slurry 119 onto one or more screens 65 of linear shaker 64. Outlet 79 of conduit 68 may be affixed to front 162 at an inlet aperture. Outlet 79 could also be affixed to back 164, to one of sides 166 or 168, or to top 172, at an inlet aperture. The feedbox may be fixedly (by welding) or detachably (by bolts, rivets or the like) attached on system 10 above linear shaker 64. The feedbox is commercially available from DEL Corporation.

Dispersing device 101 may also be configured as a possum belly. The possum belly also has front 162, back 164, sides 166, 168, bottom 170, and top 172. The possum belly may be operatively positioned adjacent to proximal end 106 of linear shaker 64 and have portion 178 extending upwardly and above linear shaker 64. Portion 178 may include opening 174 for flowing third slurry 119 out of interior 176 of the possum belly and onto screens 65 of linear shaker 64. Portion 178 may include more than one outlet opening 174 (e.g. a plurality of outlet openings 174). Outlet 79 of conduit 68 may be affixed to front 162 of the possum belly at an inlet aperture. Outlet 79 could also be affixed to back 164, to one of sides 166 or 168, to bottom 170 or top 172 of the possum belly, at an inlet aperture. In some cases, the possum belly may be fixedly (by welding) or detachably (by bolts, rivets or the like) attached to or at the side of linear shaker 64. Possum belly is commercially available from DEL Corporation.

FIGS. 1-4 reveal that system 10 may include linear shaker 64. Linear shaker 64 may contain vibrating screen media 65 that function to dewater and dry solids discharged onto screens 65. In some embodiments, vibrating screen media 65 may include one or more vibrating mesh screens that may be made of metal, such as stainless steel. In some embodiments, the vibrating screen media 65 may include one or more polyurethane slotted screens. Linear shaker 64 is commercially available from DEL Corporation.

Third slurry 119 discharged out of dispersing device 101 onto proximal end 106 of linear shaker 64 are screened by linear shaker 64 to dewater or dry the discharged solids 120. The dried solids 120 may be conveyed on screens 65 to slide 108 positioned at distal end 110 of linear shaker 64. Screens 65 may be angled relative to the ground. Dried solids 120 conveyed to slide 108 may be deposited into a catcher device, a pit, or onto the ground for later disposal or reuse.

As seen in FIG. 4, front section 78 of tank 12 may include oil skimmer 84 and an overflow pipe 88. Oil skimmer 84 may be operatively positioned in internal area 72 so that fluid in tank passes over oil skimmer 84 before reaching overflow pipe 88. Oil skimmer 84 may be fixedly (by welding) or detachably (by bolts, rivets or the like) attached to tank 12. In one embodiment, oil skimmer 84 may be substantially horizontally oriented. Front section 78 may include overflow pipe 88 through which clean effluent or fluid 132 (solids 120 substantially removed) flows out of tank 12 to equalize with the frac tanks (not shown) and then is recirculated back down the well or pumped to other tanks for processing. The height of overflow pipe 88 may be adjustable. For example, the height of overflow pipe 88 can be set about 1 to 36 inches below the top of the rim of tank 12 (e.g. top 11) or may be set in the range of 4 to 36 inches below the top rim of tank 12.

Oil skimmer 84 may be adjustable in height, such that skimmer 84 may be movable up and down depending on the position of the oil level in tank 12. For example, oil skimmer 84 may be set at least two inches higher than the height of the overflow pipe 88. Oil skimmer 84 may be configured as a horizontal skimmer or a vertical skimmer. If a horizontal skimmer, oil skimmer 84 may be a slotted skimmer pipe that skims any oil present on the surface of the fluid within tank 12. Oil skimmer 84 (whether horizontal or vertical) is commercially available from DEL Corporation.

As also seen in FIG. 4, front section 78 may include underflow weir 86. Underflow weir 86 may be operatively positioned in internal area 72 directly adjacent to overflow pipe 88. Underflow weir 86 may be positioned vertically within internal area 72. The bottom edge of weir 86 may be in the range of approximately 1 foot to 7 feet from the bottom of tank 12. The top edge of weir 86 may be in the range of 0 to 60 inches from the top of tank 12. Underflow weir 86 prevents floating debris (particularly oversized debris) from gaining entrance to overflow pipe 88. Underflow weir 86 also prevents oil from gaining entrance to overflow pipe 88.

Figure 2:
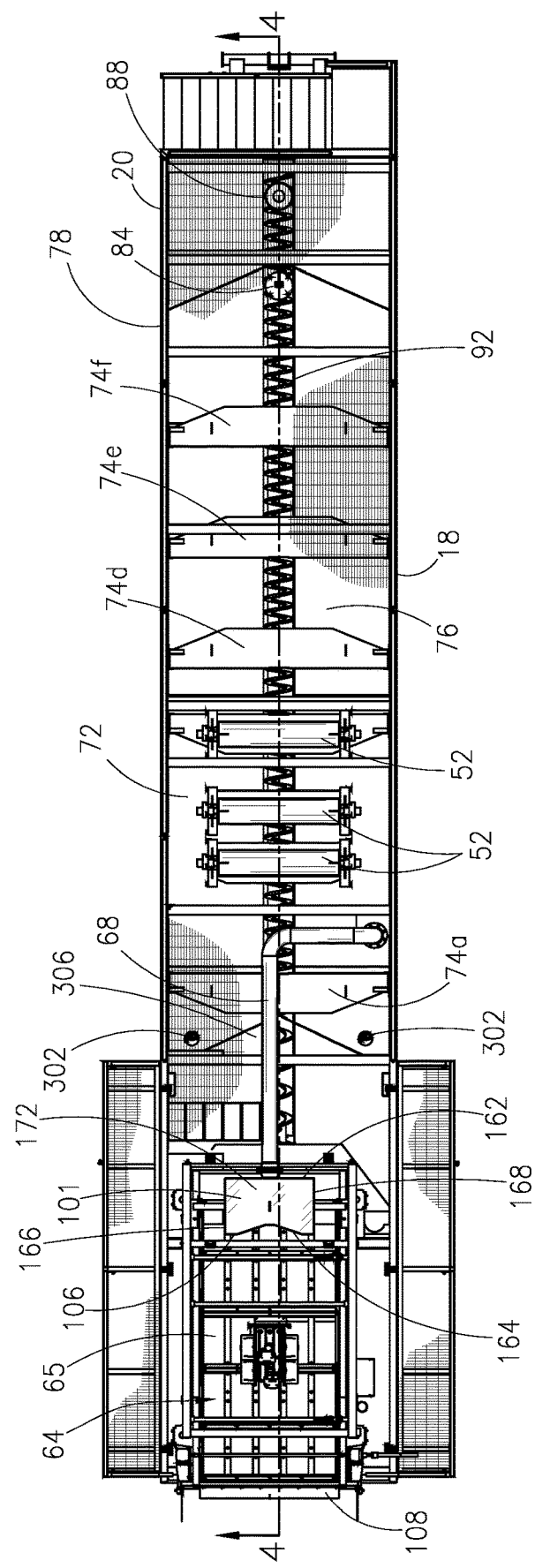
FIG. 2 is a top view of the flow back separation system shown in FIG. 1.

As seen in FIGS. 2 and 4, one or more oil skimmers 302 may be positioned at the rear of tank 12. Oil skimmers 302 may be vertical oil skimmers. In some cases, oil skimmers 302 may be adjustable in height, such that skimmers 302 may be movable up and down depending on the position of the oil level in tank 12. In some cases, oil skimmers 302 may be set at least two inches higher than the height of overflow pipe 88. Oil skimmers 302 may be respectively positioned on a first side and a second side of tank 12. Oil skimmers 302 may function to skim oil from fluid inside of tank 12. A baffle 306 may extend behind the oil skimmers 302 at the rear of tank 12. Baffle 306 may be V-shaped, similar to baffles 74a-74f. Conduit 93 may be fluidly connected to both oil skimmer 84 and oil skimmer 302 to flow the skimmed oil out of tank 12 for disposal, further processing or reuse.

Figure 5:
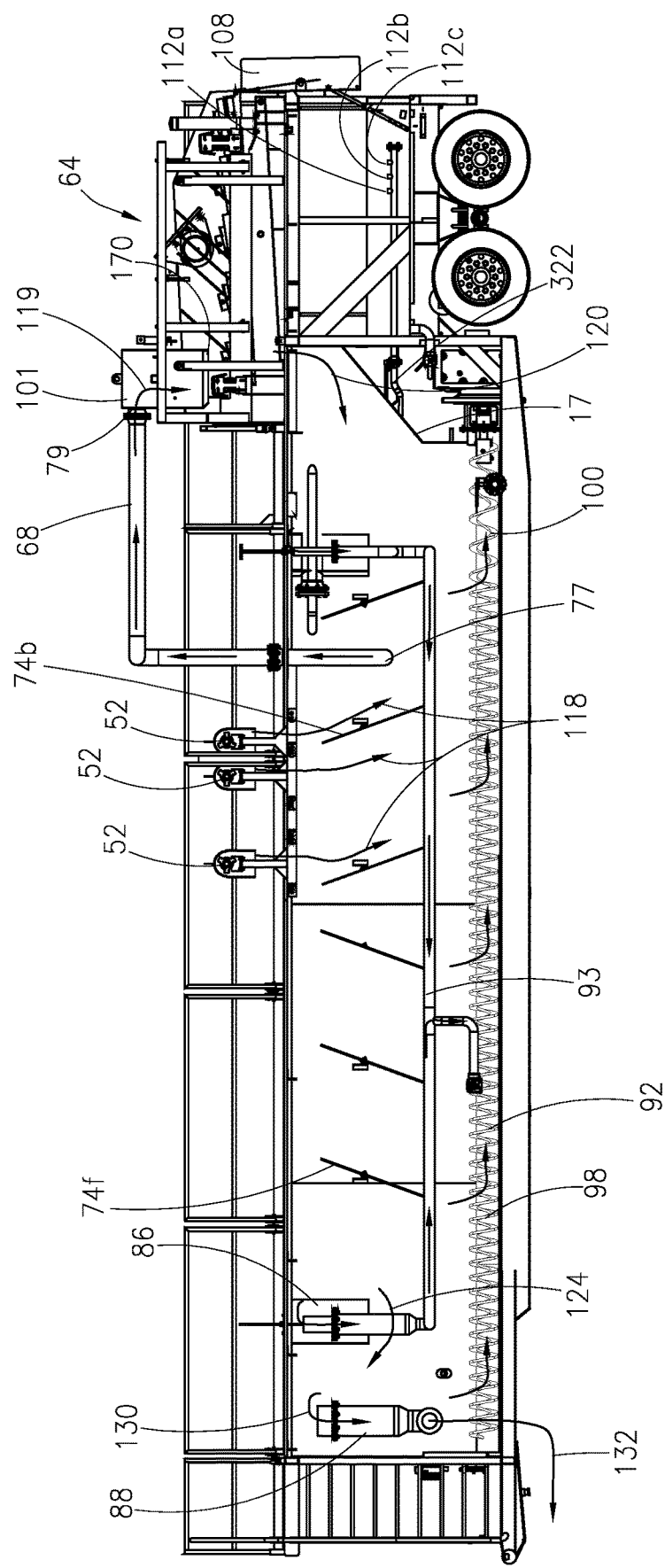
FIG. 5 is a schematic flow diagram of the flow back separation system with dispersing device.

As seen in FIGS. 1 and 5, flow back separation system 10 may include spray bar pump 320 in fluid communication with a spray bar conduit 322, which may transport clean fluid 132 from the front end of the tank 12 to linear shaker 64. Spray bar pump 320 may generate a maximum flow rate of about 300 gpm. Spray bar pump 320 is commercially available from PSI under trade name Centrifugal Pump.

Figure 6:
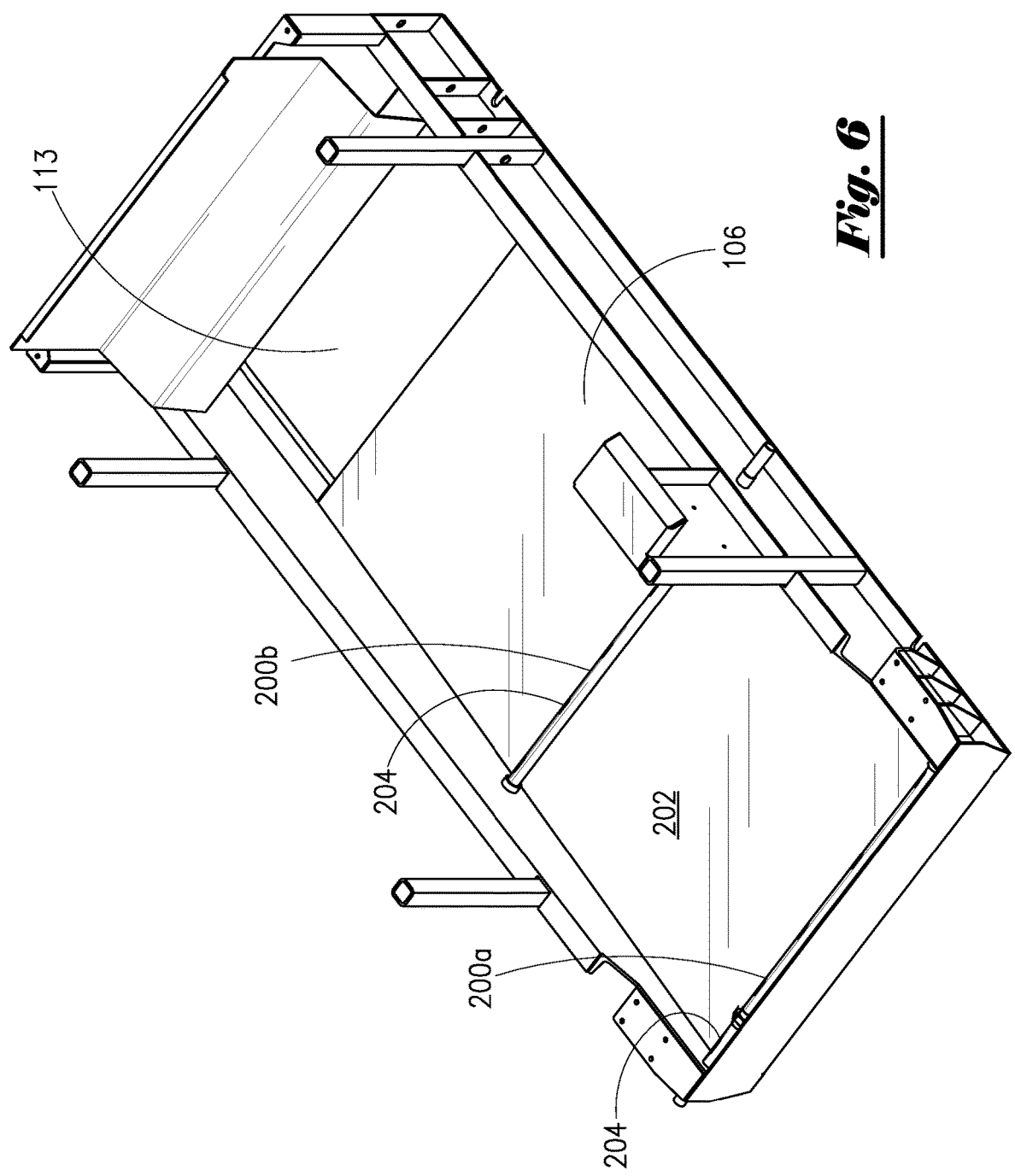
FIG. 6 is a perspective view of the bed of a linear shaker used in the flow back separation system with dispersing device.
Figure 7:
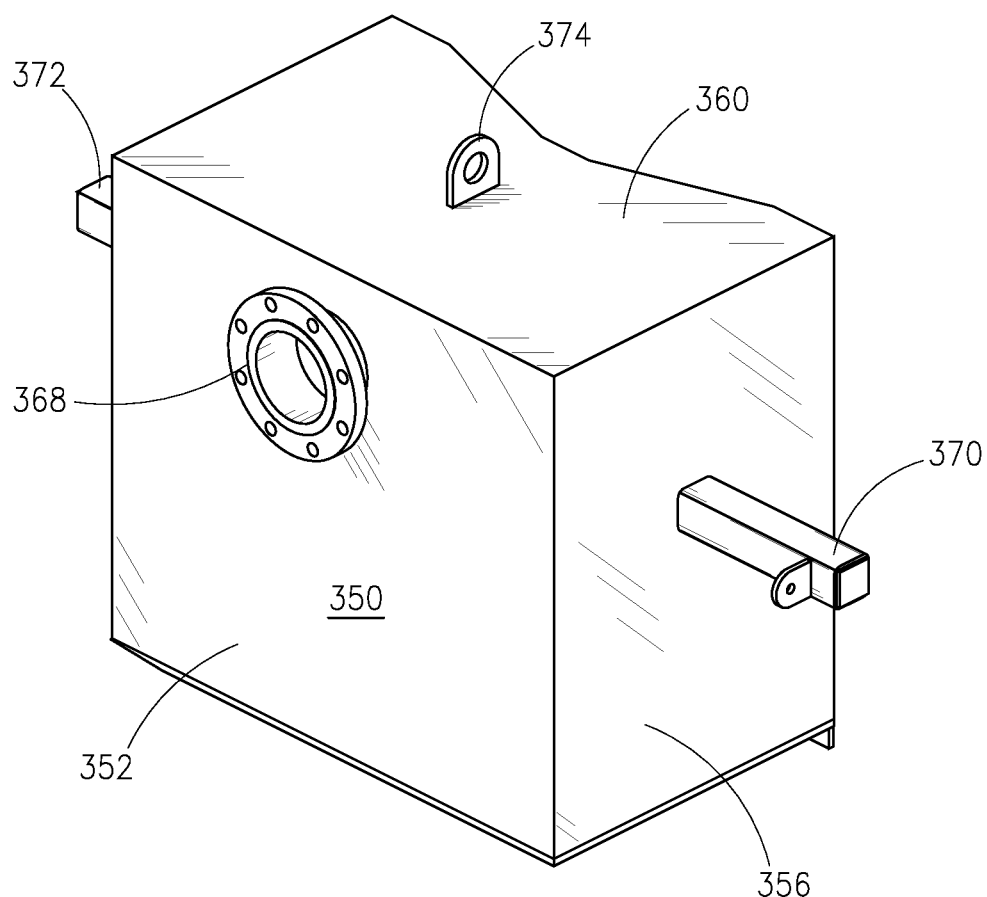
FIG. 7 is a perspective view of the dispersing device configured as a feed box.
Figure 8:
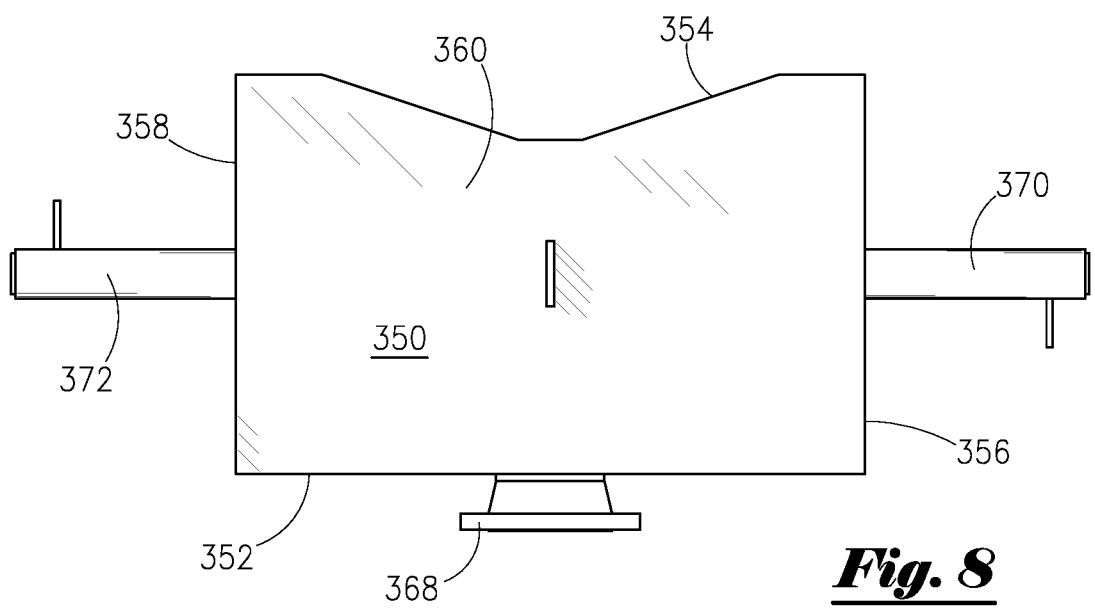
FIG. 8 is a top view of the feed box.
Figure 9:
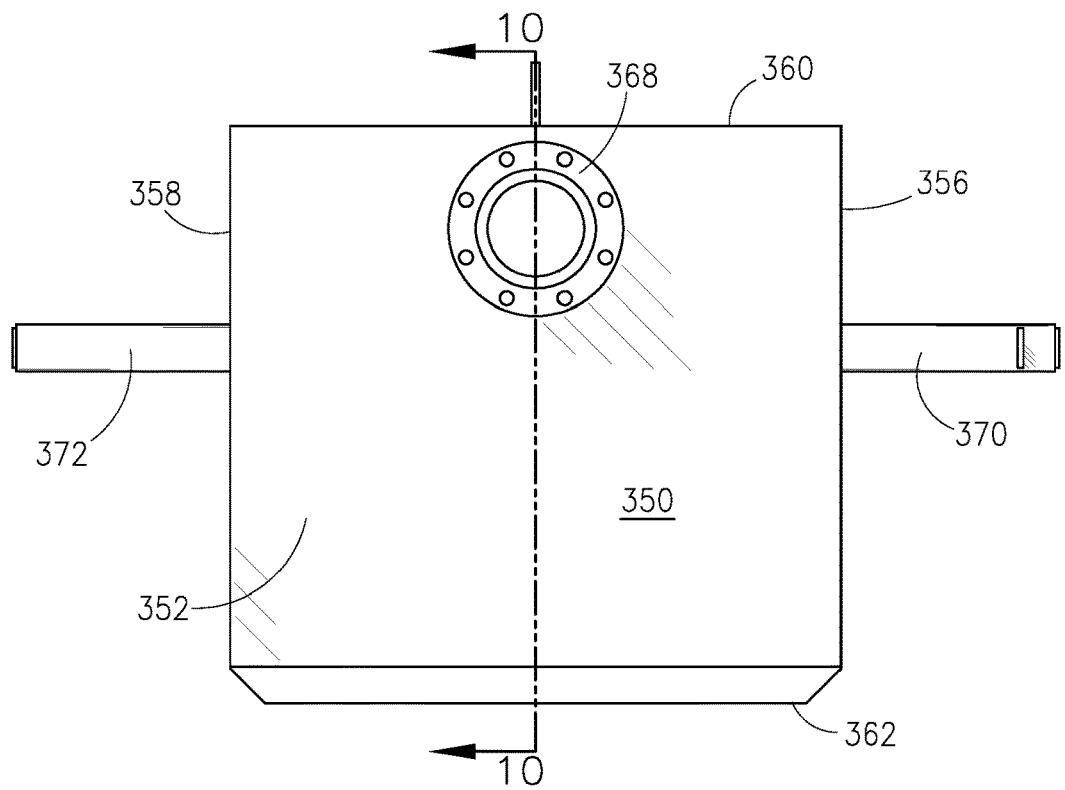
FIG. 9 front view of the feed box.
Figure 10:
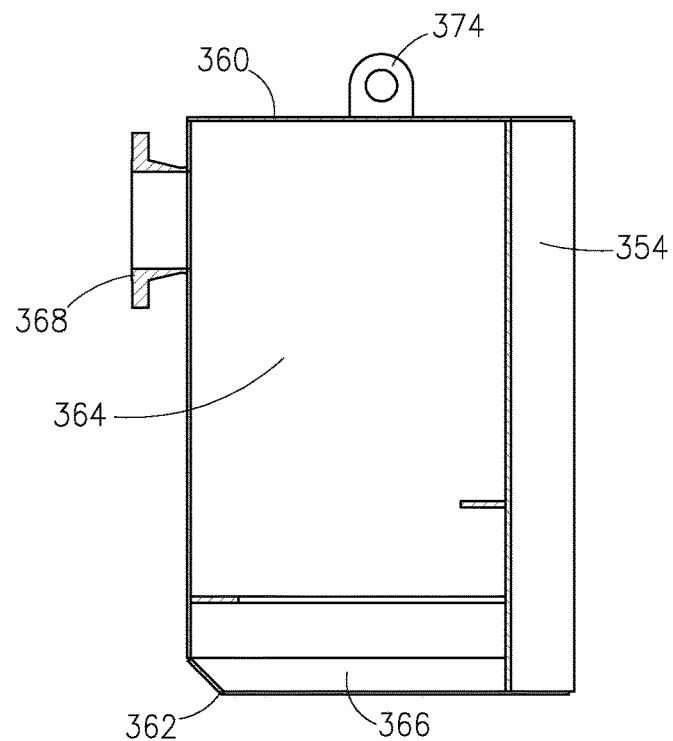
FIG. 10 is a cross-sectional view of the feed box taken along line 1010 of FIG. 9.
Figure 11:
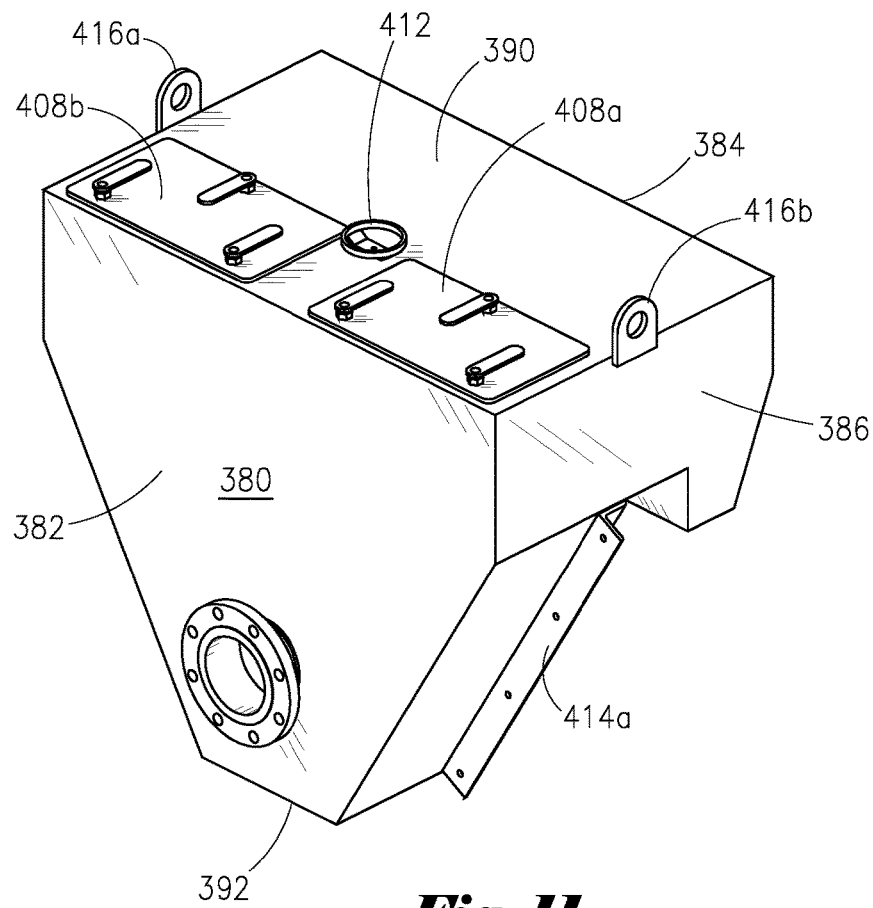
FIG. 11 is a perspective view of the dispersing device configured as a possum belly.
Figure 12:
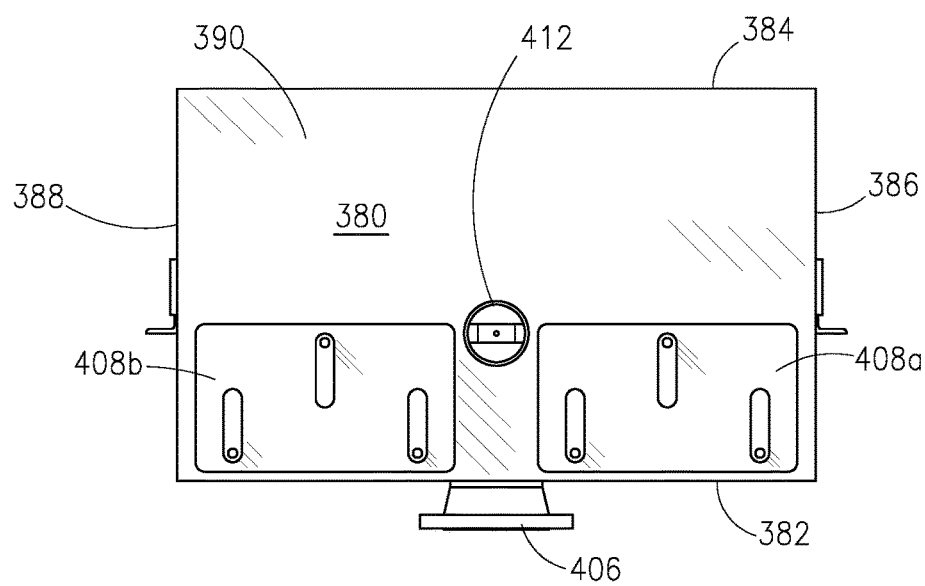
FIG. 12 is a top view of the possum belly.
Figure 13:
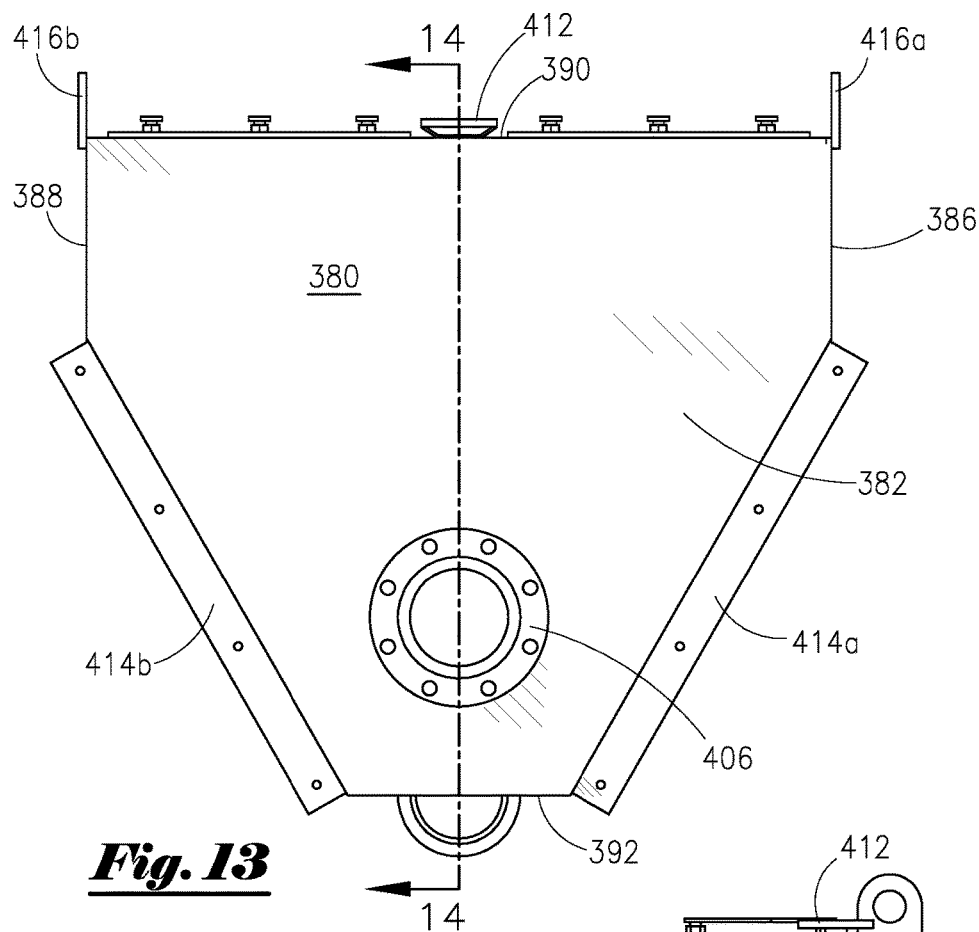
FIG. 13 is a front view of the possum belly.
Figure 14:
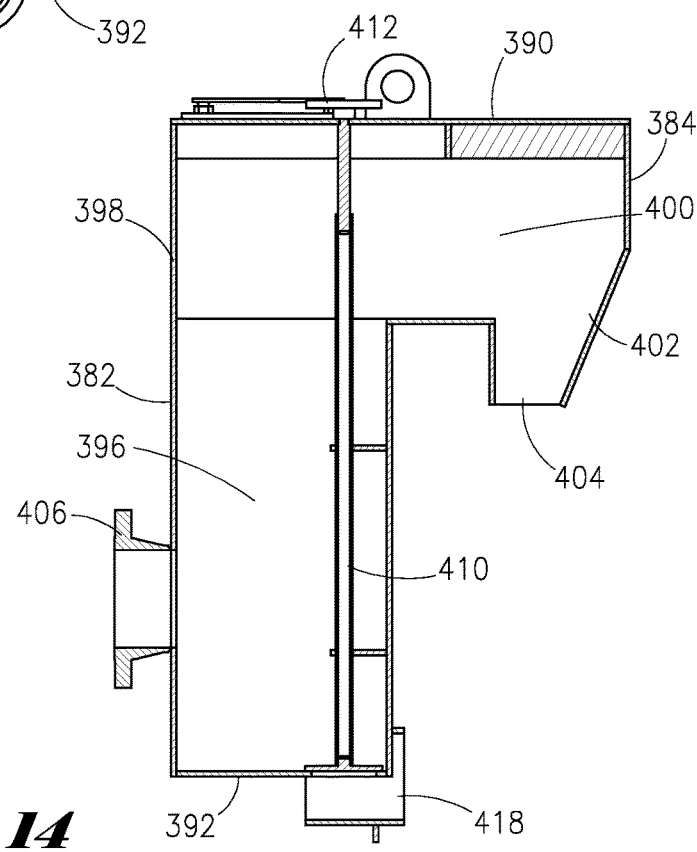
FIG. 14 is a cross-sectional view of the possum belly taken along line 1414 of FIG. 13.

FIG. 6 shows the arrangement of slotted pipes 200a, 200b in bed 202 of linear shaker 64. Spray bar conduit 322 is also in fluid communication with one or more slotted pipes 200a, 200b operatively connected to bed 202 of shaker 64. One or more flow lines 112a, 112c extending from spray bar conduit 322 may respectively connect to pipes 200a, 200b in bed 202 of linear shaker 64 to provide the clean fluid provided via the spray bar pump 320. Flow line 112b extending from the spray bar conduit 322 may connect to spray bar rack 111 of linear shaker 64 to provide the clean fluid provided via the spray bar pump 320. Slotted pipes 200a, 200b may each be approximately 1¼ inch pipe, or any suitable size. The fluid flowing through lines 112a, 112b, 112c and out of slotted pipes 200a, 200b (through slots 204) and spray bar rack 111 washes any solid (e.g., sand) build-up in bed 202 of linear shaker 64, with the underflow from linear shaker 64 (e.g. fourth slurry 128) and the flow from pipes 200a and 200b exiting at proximal end 106 through pan opening 113 and flowing back into tank 12 near rear wall 17. In some cases, slots 204 may be directed toward the proximal end 106 such as to provide fluid directed toward proximal end 106 and pan opening 113. In some cases, bed 202 may be angled toward the proximal end 106. A remote start/stop operation for spray bar pump 320 may be used to operate the spray bar pump 320.

As illustrated in FIG. 5, first slurry 116 containing solids 120 is pumped to degassing unit 52. In one embodiment, first slurry 116 may be pumped to degassing unit 52 via respective slurry flow lines for each degassing unit 52. First slurry 116 may flow into gas diffusing device 52 and may be discharged as second slurry 118 from gas diffusing device 52 into tank 12. In some embodiments, when there are more than one degassing units 52, first slurry 116 may be divided for flow into each of the degassing units 52 (e.g. the flow may be split into separate flows). Processed second slurry 118 is discharged from degassing unit 52 and enters internal area 72 of tank 12. In some embodiments, processed second slurry 118 may contact one or more baffles 74a, 74b, 74c at mid-section 76 of internal area 72. Solids 120 contained in processed second slurry 118 may settle to the bottom of internal area 72. Solids 120 will be conveyed via auger 92 towards pump 66 and will advance through inlet 77 in conduit 68 and be pumped (as part of third slurry 119) there-through out of outlet 79 into dispersing device 101.

Again as seen in FIG. 5, dispersing device 101 may receive third slurry 119 and thereafter disperse third slurry 119 onto shaker 64. Shaker 64 may dewater solids 120 contained in third slurry 119. Dewatered solids 120 will be conveyed on shaker screens 65 to a catch device or holding area as described above for later disposal or reuse. The underflow from linear shaker 64 will be discharged as fourth slurry 128 (containing any remaining solids 120) back into the rear of tank 12 with the solids 120 settling again on the bottom of internal area 72 and being conveyed via pump 66 back to dispersing device 101 for further processing of solids 120.

Referencing FIG. 5, fluid 124 flows over baffle 74f positioned adjacent to oil skimmer 84, which removes oil floating on fluid 124. Fluid 124 then flows under underflow weir 86 and into the front section where overflow pipe 88 is positioned. Overflow fluid 130 (substantially free of solids) flows into overflow pipe 88 and clean effluent or fluid 132 exits tank 12 and may equalize with the frac tanks (not shown) for reuse or recirculation in well completion operations or be pumped to other tanks for further processing.

With reference to FIGS. 7-10, dispersing device 101 may be configured as feed box 350. Feed box 350 may include front 352, back 354, left side 356, right side 358, top 360 and bottom 362. Feed box 350 may include interior 364. Bottom 362 may include outlet opening 366. Front 352 may include inlet flange 368 which provides a connection with outlet 79 of conduit 68 for the flow of third slurry 119 into interior 364. Inlet flange 368 may be positioned at the top section of front 352. Third slurry exits interior 364 through outlet opening 366 for discharge onto screen(s) 65 of linear shaker 64. Feed box 350 may include left and right side braces 370, 372 for connection to system 10 so that feed box 350 is positioned such that outlet opening 366 is situated above screen(s) 65 of linear shaker 64. Top 360 of feed box 350 may include one or more lifting eyelets 374 for lifting and transporting feed box 350 using a hoisting device.

With reference to FIGS. 11-14, dispersing device 101 may be configured as possum belly 380. Possum belly 380 may include front 382, back 384, left side 386, right side 388, top 390 and bottom 392. Possum belly may include vertical section 394 having interior 396 and horizontal section 398 having interior 400. Sides 386, 388 of vertical section 394 may be tapered or sloped in the direction from top to bottom. Back 384 of horizontal section 398 may include downwardly extending discharge spout 402 terminating at outlet opening 404. Front 382 of possum belly 380 may include inlet flange 406 which provides a connection with outlet 79 of conduit 68 for the flow of third slurry 119 into interior 396. Inlet flange 406 may be positioned at front 382 in a bottom area of vertical section 394. Third slurry 119 exits interior 400 through outlet opening 404 of discharge spout 402 for discharge onto screen(s) 65 of linear shaker 64. Possum belly 380 may include left and right side brackets 414a, 414b for connection to system 10 so that possum belly 380 is positioned such that outlet opening 404 is situated above screen(s) 65 of linear shaker 64. For example, back 384 of vertical section 394 may be adjacent to linear shaker 64 and the portion of horizontal section 398 that extends rearward from back 384 of vertical section 394 is situated over and above screen(s) 65 of linear shaker 64. Top 390 of possum belly 380 may include one or more covers 408a, 408b that provide an access opening into interiors 396, 400 of possum belly 380. Possum belly 380 may also include plug rod 410 extending from handle 412 at top 390 and through interiors 400, 396 to bottom 392. The end of plug rod 410 may selectively open and close opening 418 at bottom 392. Opening 418 provides an outlet for flushing the interiors 396, 400 of possum belly 380 to remove sediment buildup. In normal operation of possum belly 380, plug rod 410 is positioned in the closed position to close off opening 418. Possum belly 380 may include two or more lifting eyelets 416a, 416b for lifting and transporting possum belly 380 using a hoisting device.

According to features described herein, dimensions are approximate and may be scaled to size based on desired sizing and scaling.

While preferred embodiments of the disclosure have been described, it is to be understood that the embodiments described are illustrative only and that the scope of the disclosure is to be defined solely by the appended claims when accorded a full range of equivalence, many variations and modifications naturally occurring to those skilled in the art from a perusal hereof.

What is claimed is:

1. A system for separating solids from a first slurry recovered from a hydrocarbon well, comprising:

a tank having sloping side walls, a bottom, and a top, the tank having a front section, a mid-section, and a rear section;

a degassing unit operatively associated with the tank, the degassing unit configured to remove an entrained gas from the first slurry and discharging a second slurry into the tank whereby a first settling of a first solids within the second slurry takes place;

a conveying device operatively positioned on the bottom of the tank, the conveying device configured to cause the first solids to move proximate to an inlet of a first conduit operatively positioned within the tank;

a pump in fluid communication with the first conduit, the pump configured to pump a third slurry containing the first solids through the first conduit;

a dispersing device in fluid communication with an outlet of the first conduit, the dispersing device having an interior that receives the third slurry but does not separate the first solids, the dispersing device including an outlet opening through which the third slurry is discharged, the dispersing device being positioned above or adjacent to a shaker whereby the second slurry is discharged through the outlet opening onto the shaker;

the shaker being operatively positioned and configured to receive and process at least a portion of the third slurry and to cause a dewatering of the first solids to produce a dried first solids, the shaker further configured to convey the dried first solids for disposal or reuse, the shaker producing an underflow comprising a fourth slurry comprising a second solids, the shaker configured for depositing the fourth slurry into the tank for recirculation through the first conduit to the dispersing device; and an overflow device operatively positioned within the tank, the overflow device configured to provide an outlet for a first clean fluid to exit the tank.

2. The system of claim 1, wherein the dispersing device is positioned above the shaker.

3. The system of claim 2, wherein the dispersing device includes a front, a back, two sides, a top, a bottom, and an interior, and wherein the outlet opening is positioned on the bottom.

4. The system of claim 3, wherein the outlet opening comprises a plurality of outlet openings.

5. The system of claim 3, wherein the dispersing device includes an inlet aperture, and wherein the outlet of the first conduit is affixed to the dispersing device at the inlet aperture.

6. The system of claim 5, wherein the inlet aperture is positioned at the front, at one of the sides, or at the top of the dispersing device.

7. The system of claim 1, wherein the dispersing device is positioned adjacent to the shaker.

8. The system of claim 7, wherein the dispersing device includes a front, a back, two sides, a top, a bottom, and an interior, wherein the dispersing device has an extended portion rising above the shaker, and wherein the outlet opening is positioned on the extended portion above the shaker.

9. The system of claim 8, wherein the outlet opening comprises a plurality of outlet openings.

10. The system of claim 8, wherein the dispersing device includes an inlet aperture, and wherein the outlet of the first conduit is affixed to the dispersing device at the inlet aperture.

11. The system of claim 10, wherein the inlet aperture is positioned at the back, at one of the sides, or at the top of the dispersing device.

12. The system of claim 1, further comprising an oil skimmer operatively positioned within the tank.

13. The system of claim 1, further comprising one or more oil skimmers positioned within the tank at its rear section.

14. The system of claim 1, wherein the conveying device is a shaftless auger comprising a full pitch section and a half pitch section, wherein the full pitch section is operatively positioned at the rear section of the tank.

15. The system of claim 1, wherein the shaker is a linear shaker.

16. The system of claim 15, further comprising a spray bar pump in fluid communication with a spray bar conduit, wherein the spray bar pump is configured to pump the first clean fluid from the tank to the linear shaker via the spray bar conduit.

17. The system of claim 16, wherein the linear shaker includes one or more slotted pipes in fluid communication with the spray bar conduit, the one or more slotted pipes being operatively positioned adjacent a bed of the linear shaker, the one or more slotted pipes being configured to discharge a portion of the first clean fluid into the bed.

18. The system of claim 1, wherein the degassing unit comprises one or more degassing units operatively positioned over the top of the tank.

19. The system of claim 1, wherein the pump comprises a suction pump.

20. The system of claim 1, wherein the shaker is configured to convey the dried solids to a storage device.

21. The system of claim 1, wherein the overflow device comprises a pipe.

22. The system of claim 1, further comprising a first settling device operatively positioned within the tank, the first settling device configured to cause the first settling of the first solids within the second slurry.

23. The system of claim 22, wherein the first settling device comprises a first series of baffles.

24. The system of claim 23, wherein the degassing unit is operatively positioned over the top of the tank and wherein the first series of baffles are operatively positioned below the degassing unit.

25. The system of claim 23, further comprising a second series of baffles operatively positioned within the tank, the second series of baffles configured to cause a second settling of a third solids, and wherein the first series of baffles is slanted in a first direction and the second series of baffles is slanted in a second direction.

26. The system of claim 22, further comprising a second settling device operatively positioned within the tank, the second settling device configured to cause a second settling of a third solids.

27. The system of claim 26, wherein the second settling device comprises a second series of baffles.

28. The system of claim 27, further comprising an underflow weir operatively positioned within the tank directly adjacent to a last baffle comprising the second series of baffles, the underflow weir configured to cause the first clean fluid to flow under the underflow weir.

\* \* \* \* \*